Patented Sept. 22, 1936

2,055,283

UNITED STATES PATENT OFFICE 2,055,283

IMPROVED METHOD IN THE MANUFACTURE OF SODIUM ALUMINUM SULPHATE

Augustus H. Fiske, Warren, and Charles S. Bryan, Providence, R. I., assignors to Rumford Chemical Works, Rumford, R. I., a corporation of Rhode Island No Drawing. Application March 20, 1935, Serial No. 11,978

11 Claims. (Cl. 23—118)

Our present invention relates to the production of a sodium aluminum sulphate and particularly to one highly suited as an ingredient for food products, such as baking powders or the like.

It is highly desirable that such ingredients be of great purity and free from any discolorations. A pure white product therefore has been long sought but has been difficult to attain commercially on account of the presence of impurities in the bauxite source.

The usual method heretofore of manufacturing sodium aluminum sulphate has been in general to dissolve a hydrated oxide of aluminum source in sulphuric acid. The usual source was bauxite and while some deposits provide this material in a state of relative purity, it usually contains much extraneous matter. Such impurities in the material turned dark when the bauxite was dissolved in sulphuric acid and tended to persist when the insoluble residue was filtered off. The bauxites used usually contained metallic impurities and these were removed by treating with hydrogen sulphide and precipitating and filtering the precipitated sulphides from the solution. The solution was then treated with a solution of sodium sulphate and the combined solutions concentrated to the point where crystallization took place. After crushing and washing, to remove the impure mother liquor, the crystals were heated in a furnace to drive off the water of crystallization, and the resultant sodium aluminum sulphate of commerce while generally satisfactory as to purity was rendered more costly because of this long process of manufacture.

We have devised a process by which the procedure can be very materially shortened without any sacrifice of purity and a product produced which is of a much desired whiteness.

In accordance with our invention we reduce a bauxite of a very high grade of purity to a fine powder. This is run into a mixer with a calculated amount of so-called salt cake which is a commercial form of a mixture of sodium sulphate and acid sodium sulphate. We find this satisfactory although we may use acid sodium sulphate or sodium sulphate but as the salt cake is commercially available and of a desirable purity, we find it economical to supply the sulphate in this form. The salt cake is reduced to a finely divided state before being run into the mixer with the bauxite so that the two powders become intimately mixed and dispersed with each other. We then add sulphuric acid. This should be of 66° Baumé strength containing 93.19 percent of $H_2SO_4$. Other strengths of sulphuric acid may be used but we have found this strength to be satisfactory for economical commercial operation. The acid is thoroughly mixed with the previously mixed powders forming with them a soft cake in the mixer which is readily broken up by the stirring arms. The premixed powders may be stirred into the acid in the mixer if desired, and this has the advantage of avoiding any tendency to cake and become hard, but the dry ingredients must be added to the acid gradually and thoroughly stirred in. The thorough premixing of the powders before meeting the acid is highly important.

The reaction gives out heat but this is readily controllable. In this reaction the bauxite and the acid combine theoretically as $$Al_2O_3 2H_2O + 3H_2SO_4 = Al_2(SO_4)_3 + 5H_2O,$$

but the simultaneous intimate reaction of the salt cake further produces the acid sodium sulphate although the sodium sulphate returns to its normal condition in the subsequent furnace heating. Theoretically we have in this concurrent reaction $Na_2SO_4 + H_2SO_4 = 2NaHSO_4$. Any such indicated reactions must be taken as tentative because of the preferred excess of sulphuric acid used in our process.

In the furnacing at the temperatures described, the reaction involves the distillation of the excess of the sulphuric acid from the entire mass of the material during which the acid sodium sulphate becomes normal sodium sulphate again and probably the combination between the acid sodium sulphate and the aluminum sulphate produces the sodium aluminum sulphate according to such a reaction as $$Al_2(SO_4)_3 + 2NaHSO_4 = Na_2Al_2(SO_4)_4 + H_2SO_4.$$

In the foregoing statement we have used the term normal sodium sulphate to distinguish from the acid form of sodium sulphate which is written as $NaHSO_4$. What we term normal sodium sulphate is $Na_2SO_4$. This might be termed neutral sodium sulphate but in commercial work samples of supposedly neutral sodium sulphate often have a slight acidic reaction, although they are practically all $Na_2SO_4$. We therefore designate our material as sodium aluminum sulphate in which the sodium sulphate is of normal character. Our product therefore will be understood as represented by the formula $Na_2SO_4Al_2(SO_4)_3$ and not $NaHSO_4Al_2(SO_4)_3$ nor $NaHSO_4AlH_3(SO_4)_3$ nor $Na_2SO_4AlH_3(SO_4)_3$.

The bleaching action herein referred to goes on during this heating of the material in the furnace or muffle. It is a combination between the faint traces of carbon compounds in the material and the oxygen of the sulphuric acid probably according to the well known bleaching action of the acid at high temperatures where it acts as an oxidizing agent as $$C + 2H_2SO_4 = CO_2 + 2H_2O + 2SO_2.$$

After thoroughly mixing, the material is discharged from the mixer and preferably allowed to stand for a short time to make sure that the sulphuric acid has penetrated all the particles of the mixture and caused a complete chemical combination. We then place this material in a furnace heated above 640° F. which is the boiling point of pure sulphuric acid. As our upper limit we set 1418° F. which must not be exceeded as it represents the decomposition point of aluminum sulphate.

If the material is being handled in large quantities care must be taken not to overheat it. If there develops a tendency to overheating the temperature of the furnace should be preferably held just below a very dull red heat in which case such would be the upper limit. This is equivalent to about 968° F. and on commercial scales with large bodies of material it is probably the safest working temperature for our process. The heating is carried on according to the temperature and the size of the charge. The mixture of the aluminum sulphate and the sodium sulphate when heated and the water and excess sulphuric acid driven off gives us $Al_2Na_2(SO_4)_4$ which is sodium aluminum sulphate. We have found that a 500 pound charge can usually be heat treated in about 8 hours at which time it will be found to be a white lumpy material which can be ground and used in the manufacture of baking powders or other products.

A characteristic basis of procedure is as follows: With 333 lbs. of powdered bauxite we mix 300 lbs. of powdered salt cake. These are thoroughly mixed together so that they are intimately dispersed each in the other, forming as perfect a mixture as possible. This combined mixture is then mixed with 1000 lbs. of sulphuric acid of 66° Baumé strength. After a sustained mechanical mixing for about twenty minutes the material can be shoveled out of the mixer. It is preferably allowed to stand for three or four days before further processing in order to be sure that the reactions are complete. The soft cake so formed is then placed in a furnace to which may be attached a condenser to recover the excess sulphuric acid which distills from the material. At the end of about 8 hours, according to the temperatures employed, the material can be withdrawn from the furnace, cooled and powdered as before explained.

We do not confine ourselves exactly to the above proportions but they are illustratively approximate and our process works efficiently on such a basis. We preferably use an amount of sulphuric acid in excess of the theoretical amount necessary for ordinary calculated chemical reactions to combine with the bauxite as it is our experience that if we use very much less than the above specified amount of sulphuric acid the reaction is apt not to run satisfactorily. More than the above amount of the acid would, we believe, represent waste. The excess sulphuric acid besides its ordinary reactive function has the bleaching effect before described and the resultant product produced is a material of snowy whiteness. The excess sulphuric acid obtained from the furnace by condensation is preserved and used as a byproduct for whatever purposes acid of this quality is ordinarily employed.

We find that volatile impurities such as chlorides, fluorides, carbonates, organic matter, arsenic compounds and all impurities volatile at the temperature employed are set free by the sulphuric acid and volatilized by the heat during the furnacing process.

As above stated, we find it desirable to premix the dry ingredients and stir them into the acid. It is permissible to mix the sodium sulphate (or salt cake) with the sulphuric acid and then add the aluminum oxide (or bauxite) to that mixture.

We indicate as undesirable the addition of the aluminum oxide (or bauxite) to the sulphuric acid because experience has shown that such a mixture tends to form a stone-like mass which is impossible to mix, to break up or handle in a satisfactory commercial way as in a mechanical mixer.

Other variations in the steps of the method and the proportions of materials as before indicated may be resorted to within the indicated limits without departing from the spirit of our invention and will be readily varied by those skilled in calculating such proportions according to the materials used and the equipment available.

What we therefore claim and desire to secure by Letters Patent is:—

1. In a method of manufacturing sodium aluminum sulphate, those steps consisting in powdering a mineral source of commercially pure hydrated oxide of aluminum and a sodium sulphate, in intimately mixing the two powdered materials together in approximately equal proportions by weight, in treating the powdered mixture with sulphuric acid in approximately the ratio of three parts by weight to one part by weight of the hydrated oxide of aluminum or the sodium sulphate, and in subjecting the resultant product to a sustained heat treatment between approximately 640° F. and 1418° F. until the entire charge has become substantially pure sodium aluminum sulphate.

2. In a method of manufacturing sodium aluminum sulphate, those steps consisting in powdering a bauxite of high purity and a sodium sulphate, in intimately mixing the two powdered materials together in approximately equal proportions by weight, in treating the powdered mixture with sulphuric acid in approximately the ratio of three parts by weight of sulphuric acid to one part by weight of either bauxite or sodium sulphate and in subjecting the resultant product to a sustained heat treatment between approximately 640° F. and 1418° F. until the entire charge has become sodium aluminum sulphate.

3. In a method of manufacturing sodium aluminum sulphate, those steps consisting in powdering bauxite of high purity and sodium sulphate, in intimately mixing the two powdered materials together in approximately equal proportions by weight, in treating the powdered mixture with an excess of pure sulphuric acid in approximately the ratio of three parts by weight of sulphuric acid to one part by weight of either bauxite or sodium sulphate and in subjecting the resultant product to a sustained heat treatment between approximately 640° F. and 1418° F. until the entire charge has become sodium aluminum sulphate.

4. In a method of manufacturing sodium aluminum sulphate, those steps consisting in mixing a powdered mineral source of commercially pure hydrated oxide of aluminum with a powdered sodium sulphate in approximately equal proportions by weight, in treating the powdered mixture with an excess of pure sulphuric acid in approximately the ratio of three parts by weight of sulphuric acid to one part by weight of the hydrated oxide of aluminum or the sodium sulphate and in subjecting the resultant product to a sustained heat treatment between approximately 640° F. and 1418° F. until the charge has become a white lumpy substantially pure sodium aluminum sulphate and adapted to be ground to powdered form for compounding in baking powder or like products.

5. In a method of manufacturing sodium aluminum sulphate, those steps consisting in mixing a powdered mineral source of commercially pure hydrated oxide of aluminum with a powdered sodium sulphate in approximately equal proportions by weight, in treating the powdered mixture with an excess of pure sulphuric acid in approximately the ratio of three parts by weight of sulphuric acid to one part by weight of the hydrated oxide of aluminum or the sodium sulphate and in subjecting the resultant product to temperatures between 640° F. and 1418° F. until the charge has become a white lumpy substantially pure sodium aluminum sulphate and adapted to be ground to powdered form for compounding in baking powder or like products.

6. In a method of manufacturing sodium aluminum sulphate, those steps consisting in intimately premixing in powdered form a mineral source of commercially pure hydrated oxide of aluminum and a powdered sodium sulphate in approximately equal proportions by weight, in treating the powdered mixture with an excess of pure sulphuric acid in approximately the ratio of three parts by weight of sulphuric acid to one part by weight of the hydrated oxide of aluminum or the sodium sulphate and in subjecting the resultant product to a sustained heat treatment below 1418° F. until the charge has become a white lumpy substantially pure sodium aluminum sulphate and adapted to be ground to powdered form for compounding in baking powder or like products.

7. The process of manufacturing sodium aluminum sulphate consisting first in finely powdering bauxite of high purity and commercial salt cake, next in intimately dry mixing together the powdered bauxite and powdered salt cake in the ratio of approximately 333 pounds of bauxite to 300 pounds of salt cake, next in reacting the mixture of bauxite and salt cake with approximately 1000 pounds of sulphuric acid by mechanically mixing the same to produce a soft cake of material, in letting the product stand to complete reactions, in subjecting the product to a sustained heat treatment between approximately 640° F. and 1418° F. until the excess sulphuric acid has been removed and the charge has become a white sodium aluminum sulphate of normal sodium sulphate character.

8. The process of manufacturing sodium aluminum sulphate consisting first in finely powdering bauxite of high purity and commercial salt cake, next in ultimately dry mixing together the powdered bauxite and powdered salt cake in the ratio of approximately 333 pounds of bauxite to 300 pounds of salt cake, next in reacting the mixture of bauxite and salt cake with approximately 1000 pounds of sulphuric acid of 66° Baumé strength by mechanically mixing the same for approximately twenty minutes to produce a soft cake of material, in letting the product stand for approximately four days to complete reactions, in subjecting the product to a sustained heat treatment between approximately 640° F. and 1418° F. for approximately eight hours until the excess sulphuric acid has been removed and the charge has become a white sodium aluminum sulphate of normal sodium sulphate character.

9. In the production of sodium aluminum sulphate, those steps consisting in simultaneously reacting approximately equal proportions by weight of comminuted hydrated oxide of aluminum and sodium sulphate with approximately three parts by weight of sulphuric acid to every one part of either the hydrated oxide of aluminum or the sodium sulphate, to develop aluminum sulphate and acid sodium sulphate, and in heating to above the boiling point of the acid without decomposing the aluminum sulphate, whereby a sodium aluminum sulphate is produced of a normal sodium sulphate character.

10. In the production of sodium aluminum sulphate, those steps consisting in simultaneously reacting approximately equal proportions by weight of an intimate dry mixture of comminuted hydrated oxide of aluminum and sodium sulphate with approximately three parts by weight of sulphuric acid to every one part of either the hydrated oxide of aluminum or the sodium sulphate, to develop aluminum sulphate and acid sodium sulphate and in heating to above the boiling point of the acid without decomposing the aluminum sulphate whereby a sodium aluminum sulphate is produced of a normal sodium sulphate character.

11. In the production of sodium aluminum sulphate, those steps consisting in simultaneously reacting approximately equal proportions by weight of comminuted hydrated oxide of aluminum and sodium sulphate with an excess of approximately three parts by weight of sulphuric acid to every one part of either the hydrated oxide of aluminum or the sodium sulphate, to develop aluminum sulphate and acid sodium sulphate, and in heating to above the boiling point of the acid without decomposing the aluminum sulphate whereby a sodium aluminum sulphate is produced of a normal sodium sulphate character.

AUGUSTUS H. FISKE.
CHARLES S. BRYAN.